US007265764B2

(12) United States Patent
Alben et al.

(10) Patent No.: US 7,265,764 B2
(45) Date of Patent: Sep. 4, 2007

(54) SYSTEM AND METHOD FOR PROVIDING A HARDWARE ICON WITH MAGNIFICATION AND SECURITY

(75) Inventors: Jonah M. Alben, San Jose, CA (US); Bruce W. Pember, Morgan Hill, CA (US)

(73) Assignee: NVIDIA Corporation, Santa Clara, CA (US)

( * ) Notice: Subject to any disclaimer, the term of this patent is extended or adjusted under 35 U.S.C. 154(b) by 752 days.

(21) Appl. No.: 10/234,981

(22) Filed: Sep. 3, 2002

(65) Prior Publication Data

US 2004/0041845 A1 Mar. 4, 2004

Related U.S. Application Data

(60) Provisional application No. 60/406,465, filed on Aug. 27, 2002.

(51) Int. Cl.
*G09G 5/08* (2006.01)
*G06T 11/60* (2006.01)

(52) U.S. Cl. .................................................... 345/634

(58) Field of Classification Search ........ 345/634–638; 715/867; 348/584, 589, 600, 601
See application file for complete search history.

(56) References Cited

U.S. PATENT DOCUMENTS

| | | | | |
|---|---|---|---|---|
| 5,059,961 A * | 10/1991 | Cheng | ......................... | 345/10 |
| 5,351,067 A * | 9/1994 | Lumelsky et al. | .......... | 345/561 |
| 5,361,081 A * | 11/1994 | Barnaby | ..................... | 715/857 |
| 5,389,947 A * | 2/1995 | Wood et al. | ................ | 715/856 |
| 5,479,183 A * | 12/1995 | Fujimoto | .................... | 345/3.1 |
| 5,668,571 A * | 9/1997 | Pai et al. | .................... | 715/794 |
| 5,754,170 A | 5/1998 | Ranganathan | | |
| 5,764,201 A | 6/1998 | Ranganathan | | |
| 5,977,933 A * | 11/1999 | Wicher et al. | ............... | 345/3.1 |
| 6,680,739 B1 | 1/2004 | Robertus et al. | | |

FOREIGN PATENT DOCUMENTS

JP 7-175429 * 7/1995

* cited by examiner

*Primary Examiner*—Jeffery A. Brier
(74) *Attorney, Agent, or Firm*—Townsend and Townsend and Crew LLP

(57) ABSTRACT

A compositor for providing a pixel value corresponding to a current pixel is implemented on a chip. A desktop pixel logic circuit supplies a desktop pixel value. A cursor logic circuit supplies a cursor pixel value. A hardware icon logic circuit provides an icon pixel value by accessing an icon memory located on the compositor chip. The hardware icon logic circuit supports selectable magnification and color modes. Priority logic selects one of the icon pixel value, the desktop pixel value, and the cursor pixel value as the final pixel value. Whether the hardware icon is displayed can be controlled based on a hardware condition.

65 Claims, 10 Drawing Sheets

SYSTEM AND METHOD FOR PROVIDING A HARDWARE ICON WITH MAGNIFICATION AND SECURITY

CROSS-REFERENCES TO RELATED APPLICATIONS

This application claims the benefit of U.S. Provisional Application No. 60/406,465, filed Aug. 27, 2002, entitled "System and Method for Providing a Hardware Icon with Magnification And Security," which disclosure is incorporated herein by reference for all purposes.

BACKGROUND OF THE INVENTION

The present invention relates in general to generating an image on a display device and in particular to providing a hardware icon for a display device.

Existing graphics processing systems typically use a frame buffer to store graphics data, e.g., computer generated images, to be displayed on a screen or other display device. The frame buffer generally stores a data value representing a color for each pixel on the screen. To create an image on the display device, the frame buffer is scanned out, pixel by pixel (or line by line), and the values are transmitted to the display device.

To reduce the need for frequent updates to data in the frame buffer, some existing systems provide one or more overlays that cause a different image to be displayed "on top" of some portion of the frame buffer data without modifying the frame buffer data. An overlay includes a memory, either in a designated portion of the frame buffer memory or in a separate memory device, that stores pixel values defining the overlay image. The overlay may also include storage for data describing the position and size of the overlay image. During scanout, a compositor receives both a frame buffer value and an overlay value for each pixel covered by the overlay. If the overlay is active, the compositor selects the overlay value for each pixel in the overlay region and ignores the corresponding frame buffer value. In other regions, the compositor selects the frame buffer value.

Overlays are useful in various situations. For instance, playback of video data (e.g., a DVD movie) requires frequent updating of the video image data. Use of an overlay for video image data eliminates the need for frequent frame buffer updates. As another example, a cursor (e.g., a mouse pointer) is an image that moves around the screen in response to user actions; as the cursor image moves away from a particular pixel, the underlying data for that pixel should be redisplayed. A cursor overlay makes it possible to display the cursor on a portion of the screen without altering the data for the underlying image, which will become visible again as soon as the cursor is moved. Implementation of a cursor overlay is similar to that of other overlays.

If multiple overlays are present, then the compositor must include priority logic selecting one overlay to be displayed on top of the other. For instance, some existing systems support a cursor overlay and a video overlay. In these systems, the priority logic is usually designed so that the cursor is either always over or always under the video overlay.

Existing overlays are generally stored in a section of the frame buffer. Besides increasing the amount of frame buffer memory required, such implementations also necessitate additional arbitration logic within the frame buffer memory controller so that overlay data can be read from the memory for use by the compositor. Overlay data transfers to and from the frame buffer also consume memory bandwidth, which is typically a scarce resource in graphics processing systems.

Therefore, it would be desirable to provide an overlay that does not consume frame buffer memory space or bandwidth. Such an overlay could also provide additional flexibility and features.

BRIEF SUMMARY OF THE INVENTION

Embodiments of the present invention provide a "hardware icon" having various features. In some embodiments, the hardware icon can be magnified on scanout to produce a larger icon without increasing the memory requirements. In other embodiments, the hardware icon may be displayed in either a two-color mode or a multicolor mode. In yet other embodiments, the hardware icon may be displayed on an otherwise blank screen without affecting frame buffer data or other processing operations, thereby avoiding interaction with the operating system and providing increased security. In still other embodiments, the hardware icon may be selectably displayed either over or under the cursor.

According to one aspect of the present invention, a compositor for providing a pixel value corresponding to a current pixel is implemented on a chip. The compositor includes a desktop pixel logic circuit, a first on-chip memory configured to store cursor data, a second on-chip memory configured to store hardware icon data, a cursor logic circuit, a hardware icon logic circuit, and a priority logic circuit. The desktop pixel logic circuit is configured to supply a desktop pixel value corresponding to the current pixel. The cursor logic circuit is configured to read the cursor data from the first on-chip memory and to generate a cursor pixel value corresponding to the current pixel when the current pixel is within a cursor region. The hardware icon logic circuit is configured to read the hardware icon data from the second on-chip memory and to generate an icon pixel value corresponding to the current pixel when the current pixel is within an icon region. The priority logic circuit is configured to compute the final pixel value using one or more of the desktop pixel value, the cursor pixel value, and the icon pixel value. The hardware icon logic circuit may be further configured to generate an icon enable signal, and the priority logic circuit may be further configured such that the icon pixel value is not selected when the icon enable signal is not asserted. Whether the icon enable signal is asserted may be determined at least in part by a state of a hardware component of a device into which the compositor is incorporated.

According to another aspect of the invention, a compositor for providing a pixel value corresponding to a current pixel includes a desktop pixel logic circuit, a cursor logic circuit, a hardware icon logic circuit, and a priority logic circuit. The desktop pixel logic circuit is configured to supply a desktop pixel value corresponding to the current pixel. The cursor logic circuit is configured to generate a cursor pixel value corresponding to the current pixel using cursor data stored in a first memory when the current pixel is within the cursor region. The hardware icon logic circuit is configured to retrieve hardware icon data from a second memory and to generate an icon pixel value corresponding to the current pixel when the current pixel is within an icon region, wherein the hardware icon logic circuit determines the hardware icon data to be retrieved in response to an icon magnification signal, thereby enabling the hardware icon to be displayed in a magnified form. The priority logic circuit is configured to compute the final pixel value using one or more of the desktop pixel value, the cursor pixel value, and the icon pixel value.

According to yet another aspect of the invention, a compositor for providing a pixel value corresponding to a current pixel includes a desktop logic circuit, a cursor logic circuit, a hardware icon logic circuit, and a priority logic circuit. The hardware icon logic circuit is configured to operate in one of a monochrome mode and a multicolor mode in response to a color mode signal. In the monochrome mode, the hardware icon logic circuit retrieves one bit of the hardware icon data, and in the multicolor mode, the hardware icon logic circuit retrieves a plurality of bits of the hardware icon data. The multicolor mode may be a palette color mode.

According to a further aspect of the invention, a compositor for providing a pixel value corresponding to a current pixel includes a desktop pixel logic circuit, a cursor logic circuit, a hardware icon logic circuit, and a priority logic circuit configured such that when the current pixel is within both the icon region and the cursor region, the priority logic circuit selects the icon pixel value under a first operating condition and the cursor pixel value under a second operating condition.

According to a still further aspect of the invention, a compositor for providing a pixel value corresponding to a current pixel includes: a desktop pixel logic circuit configured to supply a desktop pixel value corresponding to the current pixel; a first register configured to store a blank-screen color value; a second register configured to store a state of a blank enable signal; and a first selection circuit configured to select one of the desktop pixel value and the blank-screen color value to be provided in response to the state of the blank enable signal. Accordingly, when the blank enable signal is in an asserted state, a blank screen—rather than desktop data—is displayed. The compositor may also include a hardware icon logic circuit configured to read hardware icon data from an on-chip memory, to supply an icon pixel value corresponding to the current pixel when the current pixel is within an icon region, and to generate an icon enable signal; and a second selection circuit configured to receive the icon pixel value and the icon enable signal from the hardware icon circuit, to receive as an underlying pixel value the selected one of the desktop pixel value and the blank-screen color value, and to provide one of the icon pixel value and the underlying pixel value in response to the icon enable signal. The state of the blank enable signal may be changed in response to a user action, without an action by an operating system. If the icon enable signal is asserted while the blank enable signal is also asserted, the icon image is displayed on the otherwise blank screen.

According to another aspect of the present invention, a method for providing a pixel value corresponding to a current pixel includes: receiving a desktop pixel value corresponding to the current pixel; when the current pixel is within a cursor region, obtaining a cursor pixel value corresponding to the current pixel using cursor data stored in a first on-chip memory; when the current pixel is within an icon region, obtaining an icon pixel value corresponding to the current pixel using hardware icon data stored in a second on-chip memory, the second on-chip memory being located on the same chip as the first on-chip memory; and computing the final pixel value from the desktop pixel value, the cursor pixel value, and the icon pixel value. An icon magnification factor may be used to determine an icon pixel value corresponding to the current pixel. The method may also include reading one bit of data from the second on-chip memory in a monochrome mode and reading multiple bits of data from the second on-chip memory in a multicolor mode. Computing the final pixel value may include, when the current pixel is within both the icon region and the cursor region, selecting the icon pixel value under a first operating condition, and selecting the cursor pixel value under a second operating condition.

According to still another aspect of the invention, a method for providing a pixel value corresponding to a current pixel includes: receiving a desktop pixel value corresponding to the current pixel; receiving a blank enable signal; when the blank enable signal is in an asserted state, selecting a predefined blank-screen color value as the pixel value; and when the blank enable signal is not in the asserted state, selecting the desktop pixel value as the pixel value. The method may also include: detecting a locking action performed by a user of a device; in response to the locking action, setting the blank enable signal to the asserted state; subsequently detecting an unlocking action performed by the user; and in response to the unlocking action, setting the blank enable signal to a non-asserted state. Setting the blank enable signal to the asserted state and setting the blank enable signal to the non-asserted state may be performed without an action by an operating system of the device.

The following detailed description together with the accompanying drawings will provide a better understanding of the nature and advantages of the present invention.

DETAILED DESCRIPTION OF THE INVENTION

According to an embodiment of the present invention, a hardware icon is a displayed image that is generated from data stored in a dedicated storage area resident on a compositor chip in a graphics or display controller subsystem. The hardware icon is displayed as part of a composite image, with other parts of the composite image being supplied by other data sources such as frame buffers, video overlay memories, and a cursor data source. A hardware icon may be used, for instance, to indicate a hardware condition, such as a low battery condition. In some embodiments, the content of the dedicated storage area is updated without interaction with an operating system.

Figure 1:
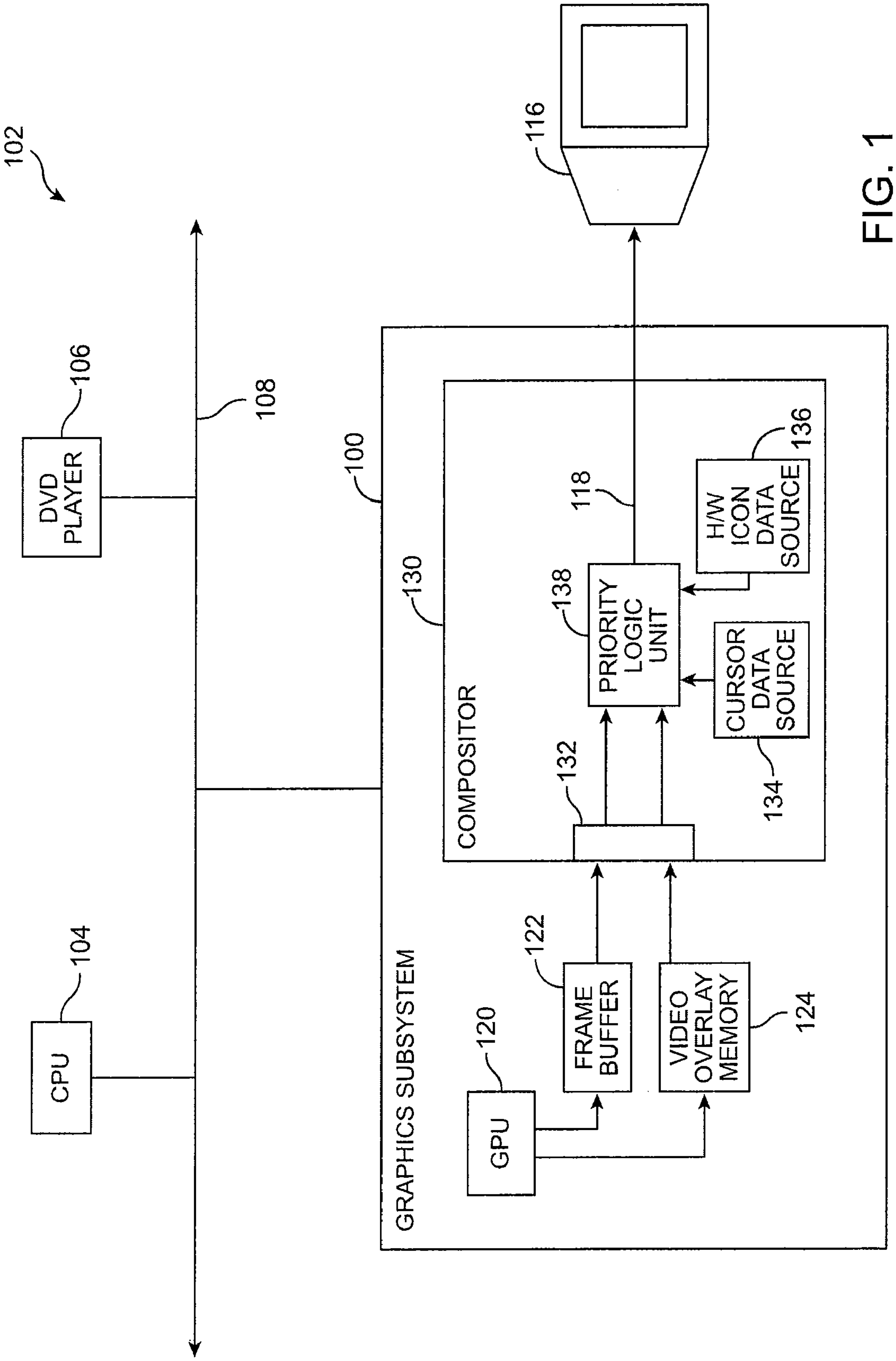
FIG. 1 is a simplified block diagram of a computer system including a graphics processing subsystem according to the present invention.

Referring to FIG. 1, there is illustrated one embodiment of a graphics subsystem 100 that is configured to generate an image that includes a hardware icon. In this embodiment, graphics subsystem 100 is a component of a computer system 102, which also includes a central processing unit (CPU) 104 and a DVD player 106 connected to graphics subsystem 100 via a bus 108. Computer system 102 may also include other components (not shown), such as memory, fixed or removable disk drives, user interface components (keyboard, mouse, etc.) and the like. Such components may be of conventional design.

Graphics subsystem 100 receives graphics data from system components such as CPU 104 and DVD player 106 via bus 108 and provides display data to a display device 116. Display device 116 produces images by controlling the color at each of a number of discrete areas (pixels) making up the displayed image. Display device 116 may be any type of pixel-based device, including CRT or LCD monitors, digital projectors, and the like. Graphics subsystem 100 provides a color value for each pixel of display device 116 via an output data line 118. Depending on the configuration of the display interface for display device 116, color values may be provided for each pixel sequentially or for groups of pixels in parallel, in either digital or analog form.

Graphics subsystem 100 includes a graphics processing unit (GPU) 120, a frame buffer 122, a video overlay memory 124, and a compositor 130. GPU 120 processes image data received via bus 108 from other components of computer system 102 and generates corresponding pixel data, which is then stored pending transmission to display device 116. In this embodiment, graphics processing unit 120 uses frame buffer 122 for storing pixel data originating from an application program being executed by CPU 102 and video overlay memory 124 for storing pixel data originating from video data provided by a DVD player 110 playing a DVD movie. Other data storage configurations are possible.

Compositor 130 performs scanout operations, whereby pixel values are provided to display device 116, either for each pixel sequentially or for multiple pixels in parallel. Compositor 130, which is advantageously implemented on a single chip, includes a memory interface 132, a cursor data source 134, a hardware icon data source 136, and a priority logic unit 138. Memory interface 132 accesses frame buffer 122 and video overlay memory 124 to provide pixel values from these sources to priority logic unit 138. Cursor data source 134 provides pixel data describing a cursor (e.g., mouse pointer) to be displayed on the screen and may be of conventional design. In one embodiment, cursor data source receives pixel data for a line of pixels at a time from the frame buffer during scanout. In another embodiment, pixel data for the cursor is provided directly to an on-chip cursor memory by GPU 120, based on data received from CPU 104 or other system components via bus 108. Hardware icon data source 136 provides image data for a hardware icon. The hardware icon can be used for various purposes, such as indicating a particular system condition (e.g., a low battery). As will be described further below, hardware icon image data may be supplied at the basic input/output system (BIOS) level of system 102, independent of an operating system (OS) that may be in use. Examples of embodiments of hardware icon data source 136 will be described further below.

Priority logic unit 138 selects the final value for each pixel from candidate values provided by frame buffer 122, video overlay 124, cursor data source 134, and hardware icon (or simply "icon") data source 136, respectively. In one embodiment, priority logic unit 138 may simply select one of the candidate values according to fixed or programmable priority rules; alternatively, priority logic unit 138 may blend two or more of the values. Specific embodiments of priority logic unit 138 will be described further below.

In some embodiments, some or all of the pixel-value sources also provide corresponding enable signals to priority logic unit 138. When the enable signal for a particular source is not asserted, priority logic unit 138 ignores any pixel values provided by that source. For instance, if the hardware icon is being used to indicate a low battery condition, an icon enable signal from hardware icon data source 136 is asserted only when the battery power dropped below a specified threshold level. As long as the battery power remained above that level, the icon enable signal is de-asserted, and priority logic unit 138 ignores any pixel values provided by hardware icon data source 136. In addition, the icon enable signal may be used as indicators of whether the current pixel is inside or outside a screen region where the icon is to be displayed. The generation and use of an icon enable signal will be described further below.

The final pixel value generated by priority logic unit 138 is transmitted via data line 118 to display device 116 where it causes a pixel to take on the designated color. It is to be understood that any suitable method of using pixel values to generate a displayed image for a particular display device may be employed; additional functionality, such as gamma-correction and digital-to-analog conversion, may also be included.

Figure 2:
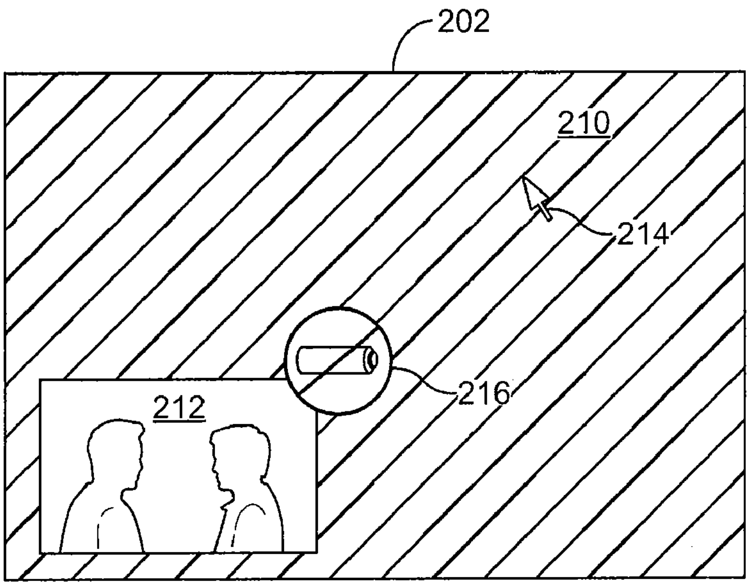
FIG. 2 is an illustration of a displayed image on a display device according to an embodiment of the present invention.

FIG. 2 illustrates a composite image 202 that may be produced on display device 116 using graphics subsystem 100. Composite image 202 includes a frame buffer image 210, a video image 212, a cursor 214, and a hardware icon 216. Frame buffer image 210 (hatched area) consists of pixel values obtained from frame buffer 122; this image may include application data (e.g., a World Wide Web browser window), a fixed background picture, and the like. Video image 212, which appears on top of frame buffer image 210, consists of pixel values obtained from video overlay memory 124. Cursor 214 is generated using pixel values provided by cursor data source 134. In general, cursor 214 may be moved to different parts of the composite image 202 in response to user motions of a pointing device (e.g., a mouse). Hardware icon 216 appears on top of the video image 212. In this instance, hardware icon 216 is a low-battery indicator, but the particular icon image may be varied to indicate other conditions, as will be described below. Although hardware icon 216 obscures various portions of frame buffer image 210 and video image 212, the pixel values in frame buffer 122 and video overlay memory 124 are not affected because a separate image data source is provided for hardware icon 216.

It will be appreciated that the computer system described herein is illustrative. Graphics subsystem 100 or components thereof, such as compositor 130, may be included in any device or system that includes a display. In view of the teachings of the present disclosure, modification of graphics subsystem 100 or compositor 130 for use in other devices that include a display (e.g., television monitors, handheld devices, digital projection systems, etc.) will be straightforward to one of ordinary skill in the art.

Figure 3:
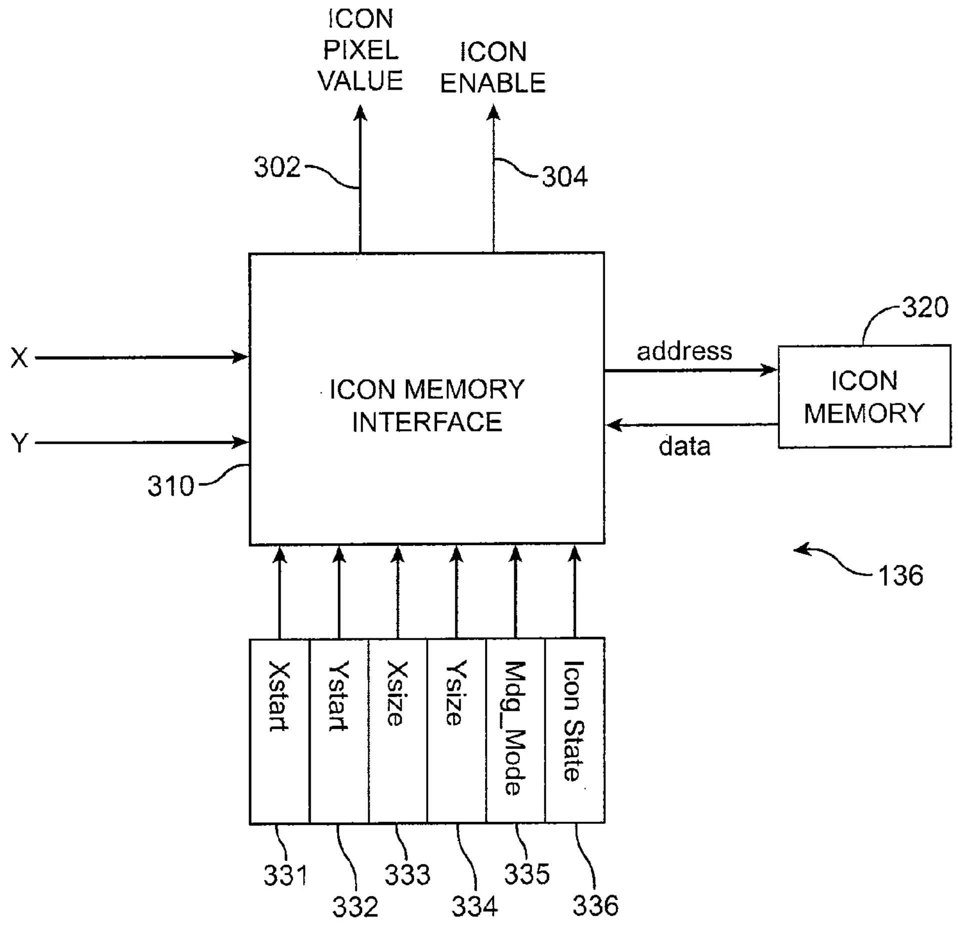
FIG. 3 is a simplified block diagram of a hardware icon data source according to an embodiment of the present invention.

FIG. 3 illustrates an embodiment of hardware icon data source 136 according to the present invention. In this embodiment, hardware icon data source 136 receives screen coordinates (X, Y) identifying a current pixel and provides a corresponding pixel value 302 and an icon enable signal 304 to priority logic unit 138. When icon enable signal 304 is de-asserted, priority logic unit 138 ignores icon pixel value 302, as will be described further below. Hardware icon data source 136 includes an icon memory 320, a set of icon registers 331-336, and an icon memory interface 310. Icon memory 320 stores a value for each pixel in the hardware icon. In one embodiment, icon memory 320 is a 64×64-bit RAM, with each bit corresponding to a different pixel; a value of "0" for a bit causes one color (e.g., black) to be displayed and a value of "1" for a bit causes another color (e.g., white) to be displayed. In other embodiments, icon memory 320 may include more than one bit per pixel, thereby allowing the hardware icon image to include more than two colors.

Icon position registers 331-336 store data defining where on the screen the hardware icon is to appear. The icon position may be defined using screen coordinates of one corner of the icon (Xstart, Ystart) stored in registers 331 and 332.

Coordinates for the other corners of the icon may be determined using size values (Xsize, Ysize) stored in registers 333, 334. Register 335 stores a magnification mode value (mag_mode) that can be used to cause a larger version of the icon image to be displayed without requiring additional pixel data to be stored in icon memory 320. The magnification mode corresponds to a magnification factor F, so that the lower right corner of the icon is at a screen coordinate (Xstart+Xsize*F, Ystart+Ysize*F). In one embodiment, the magnification mode has values of "0", "1" and "2" corresponding to magnification factors F of 1 (i.e., no magnification), 2 and 4. Other magnification factors may be provided.

Register 336 stores an icon state signal, which has an "active" value and an "inactive" value, for use in determining whether the hardware icon is to be displayed at a particular time. As described above, in some embodiments, the hardware icon is displayed only under certain conditions (e.g., when the battery power is low). Accordingly, register 336 may be configured to receive and store a one-bit state value indicating whether the condition for displaying the hardware icon is satisfied. When the state value in register 336 indicates that the icon is not to be displayed, icon enable signal 304 is de-asserted for all pixels.

Icon memory interface 310 receives screen coordinates (X, Y) of a current pixel and reads the appropriate bits from icon memory 320. In some embodiments, icon memory interface 310 also performs further operations on data read from icon memory 320 to generate the icon pixel value 302.

Figure 4:
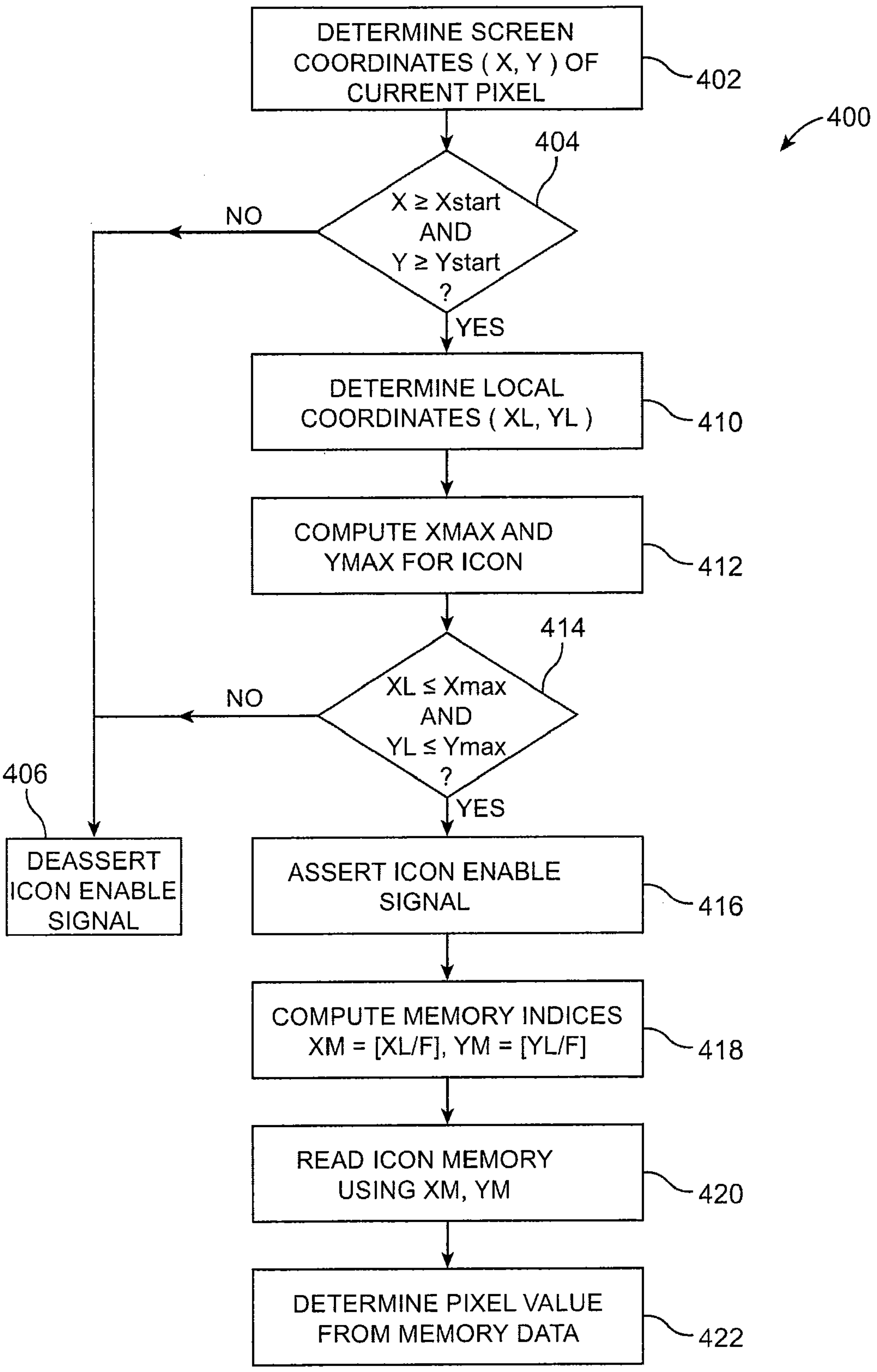
FIG. 4 is a flow chart illustrating a process for generating hardware icon data according to an embodiment of the present invention.

FIG. 4 illustrates a process 400 that may be performed by icon memory interface 310 to generate icon pixel value 302 and enable signal 304. Process 400 involves determining whether the current pixel is within the icon, and if it is, selecting the appropriate pixel data from icon memory 320.

More specifically, at step 402, screen coordinates (X, Y) of the current pixel are determined. The implementation of step 402 may be conventional; for instance, screen coordinates may be determined using a pixel clock that pulses once per pixel. Such clocks are known in the art. The X (horizontal) coordinate may be determined by counting each pulse of the pixel clock and resetting the counter at each occurrence of an end-of-line (hsync) signal. The Y (vertical) coordinate may be determined by counting each end-of-line signal and resetting the counter at each occurrence of an end-of-frame (vsync) signal. In some embodiments, these counters are incorporated into hardware icon data source 136; in other embodiments, compositor 130 generates X and Y coordinate values and provides them to various components including icon memory interface 310 of hardware icon data source 136.

At step 404, the current screen coordinates (X, Y) are compared to the starting coordinates (Xstart, Ystart) stored in registers 331 and 332. If X is less than Xstart, then the current pixel is to the left of the icon; if Y is less than Ystart, then the current pixel is above the icon. Thus, unless the appropriate conditions are satisfied, the icon enable signal 304 is de-asserted at step 406. In this case, de-assertion of icon enable signal 304 causes priority logic unit 138 to ignore icon pixel value 302, and accordingly any value (e.g., zero) may be provided as icon pixel value 302.

When the current pixel is neither above nor to the left of the icon, it must be determined whether the pixel is below or to the right of the icon. At step 410, local coordinates (XL, YL) reflecting the position of the current pixel relative to (Xstart, Ystart) are generated. For instance, local coordinate XL may be generated by counting pulses of the pixel clock that occur while the condition of step 404 is satisfied, with the count being reset at each occurrence of the hsync signal. Local coordinate YL may be generated by counting occurrences of the hsync signal while the condition of step 404 is satisfied, with the count being reset at each occurrence of the vsync signal. Other techniques may also be used, such as subtracting Xstart from X and subtracting Ystart from Y.

At step 412, the largest values (Xmax, Ymax) of local coordinates XL and YL that are within the icon region are determined. This can be done by multiplying Xsize and Ysize by the magnification factor F. Where the magnification factor F is a power of two, multiplication can be implemented using bit-shifting, as is known in the art. At step 414, XL and YL are compared to Xmax and Ymax, respectively. If XL is larger than Xmax, then the current pixel is to the right of the icon, and if YL is larger than Ymax, then the current pixel is below the icon. In either case, the process de-asserts the icon enable signal at step 406.

When the condition of step 414 is satisfied, the pixel is within the icon, and icon enable signal 304 is asserted at step 416. A corresponding icon pixel value 302 is then determined by the remaining steps. At step 418, local coordinates XL, YL are adjusted to account for the magnification mode by dividing by the magnification factor F and truncating the result. Where F is a power of two, division and truncation may be implemented using bit-shifting. The resulting memory indices (XM, YM) are used to perform a read operation on icon memory 320 at step 420. In one embodiment, icon memory 320 is a 64×64 array of memory cells holding one bit per pixel, and XM and YM are used to cause the corresponding memory cell to be read.

It should be noted that when the magnification factor F is 2 (4), the same values of the memory indices XM, YM are used for each pixel in a 2×2 (4×4) block of adjacent pixels. Thus, each pixel in the icon is effectively magnified 2 (4) times, resulting in a larger displayed image.

At step 422, an icon pixel value 302 is determined from the data read from icon memory 320. Where one bit per pixel is used, the bit value may be the pixel value; alternatively, the bit value may be used to select one of two colors stored in registers of icon memory interface 310.

Figure 5:
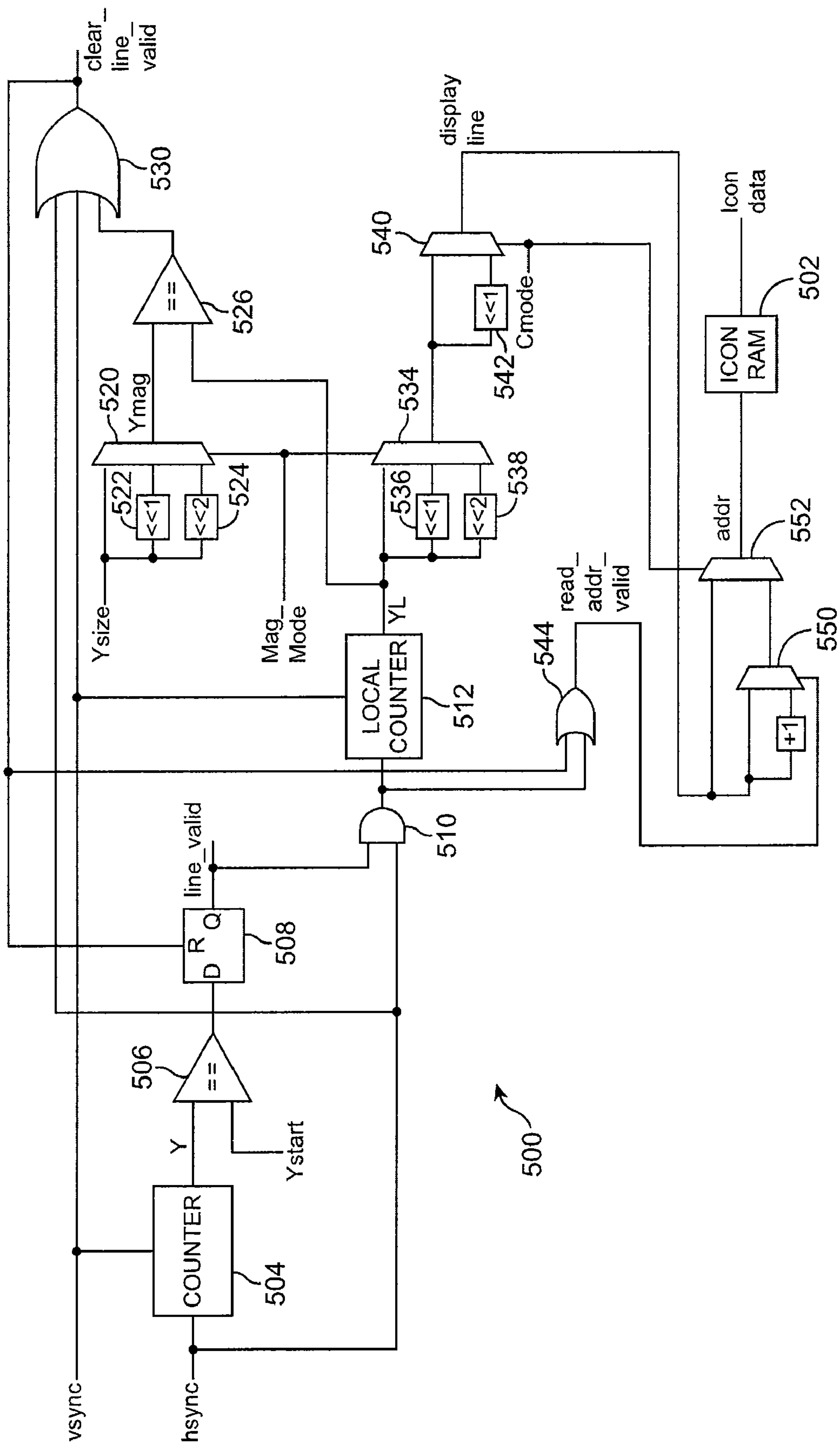
FIG. 5 is a simplified schematic diagram of an embodiment of an address generator for a hardware icon data source according to an embodiment of the present invention.

In some embodiments, data for multiple pixels may be read in parallel from icon memory 320. FIG. 5 illustrates an embodiment of an address generator 500 for a hardware icon memory interface that reads hardware icon data from a 64×64-bit icon RAM 502 for a line of pixels at a time. In this embodiment, the hardware icon data may be stored in either a "monochrome" mode or a "multicolor" mode. In monochrome mode, one bit per pixel is stored in icon RAM 502 to identify one of two colors (e.g., black and white) for the pixel; in multicolor mode, multiple bits per pixel are stored and used to identify one of a corresponding number of colors (e.g., four bits per pixel may be used to identify one of sixteen colors). The mode is controlled by a mode-control signal (Cmode), a value for which may be stored in a register (not shown).

A first counter 504 increments on each end-of-line (hsync) signal and resets on each end-of-frame (vsync) signal. The output of first counter 504 is the Y coordinate for the current line of pixels. A comparator 506 compares Y to the icon starting coordinate Ystart; the result is latched by a latch 508, which provides a line_valid signal to other components, indicating whether the current line is within the icon. An AND circuit 510 receives the hsync signal and the line_valid signal, and provides its output to a second counter 512. Second counter 512 counts hsync signals that occur while the line_valid signal is asserted. The output of second counter 512 is a local Y coordinate (YL), which is used to determine whether the current line is below the icon and to select a row to be read from icon RAM 502.

To determine whether the current line is below the icon, the vertical size of the icon (Ysize) is adjusted for the icon magnification factor by a multiplexer 520 in conjunction with bit shifters 522, 524. Bit shifters 522, 524 multiply the value of Ysize by factors of 2 and 4, respectively. The appropriate multiple (1, 2, or 4) of Ysize is selected by multiplexer 520 in response to the icon magnification (mag_mode) signal. The resulting height (Ymag) is compared to the local coordinate YL by a comparator 526. An OR circuit 530 generates a clear_line_valid signal when YL exceeds Ymag. The OR circuit also generates the clear_line_valid signal when a vsync signal or an hsync signal is received. The clear_line_valid signal resets latch 508, thereby de-asserting the line_valid signal.

To select a row to be read from icon RAM 502, the local coordinate YL is adjusted for the icon magnification factor using a multiplexer 534 responsive to the mag_mode signal, in conjunction with bit shifters 536, 538 that provide appropriate multiples of YL. In addition to the icon magnification factor, the choice of color mode will affect which row is to be read out. More specifically, in monochrome mode, one bit per pixel for a 64×64-pixel icon is stored, and each line of pixels occupies one row of icon RAM 502. In multicolor mode, four bits per pixel for a 32×32-pixel icon are stored, and each line of pixels occupies two rows of icon RAM 502. A bit shifter 542 and a multiplexer 540 controlled by the color mode signal Cmode are used to generate a display_line signal. An OR circuit 544 receives the output signal from AND circuit 544 and the clear_line_valid signal, and generates a read_addr_valid signal, which in the multicolor mode causes a second row of icon data to be read from icon RAM 502.

The read_addr_valid signal is provided as a control signal to a multiplexer 550, which selects either the display_line signal or another input signal that is an incremented display_line signal. A multiplexer 552 selects between the output signal from multiplexer 550 and the display_line signal, with the selection controlled by the color mode signal Cmode. The output signal of multiplexer 552 is used as a row address to read 64 bits of hardware icon data from icon RAM 502. Accordingly, when the color mode is the monochrome mode, the selected row has the address YM (i.e., YL divided by the magnification factor F). When the color mode is the multicolor mode, two rows are selected in succession, with addresses 2*YM and 2*YM+1. Determination of whether the X coordinate of the current pixel is within the icon region and selection of the bit(s) from the row of icon data corresponding to the X coordinate of the current pixel can be implemented using analogous circuitry.

It will be appreciated that reading of hardware icon data for multiple pixels in parallel may be implemented in other ways and may also be implemented in embodiments where only one color mode is provided for the hardware icon.

Figure 6:
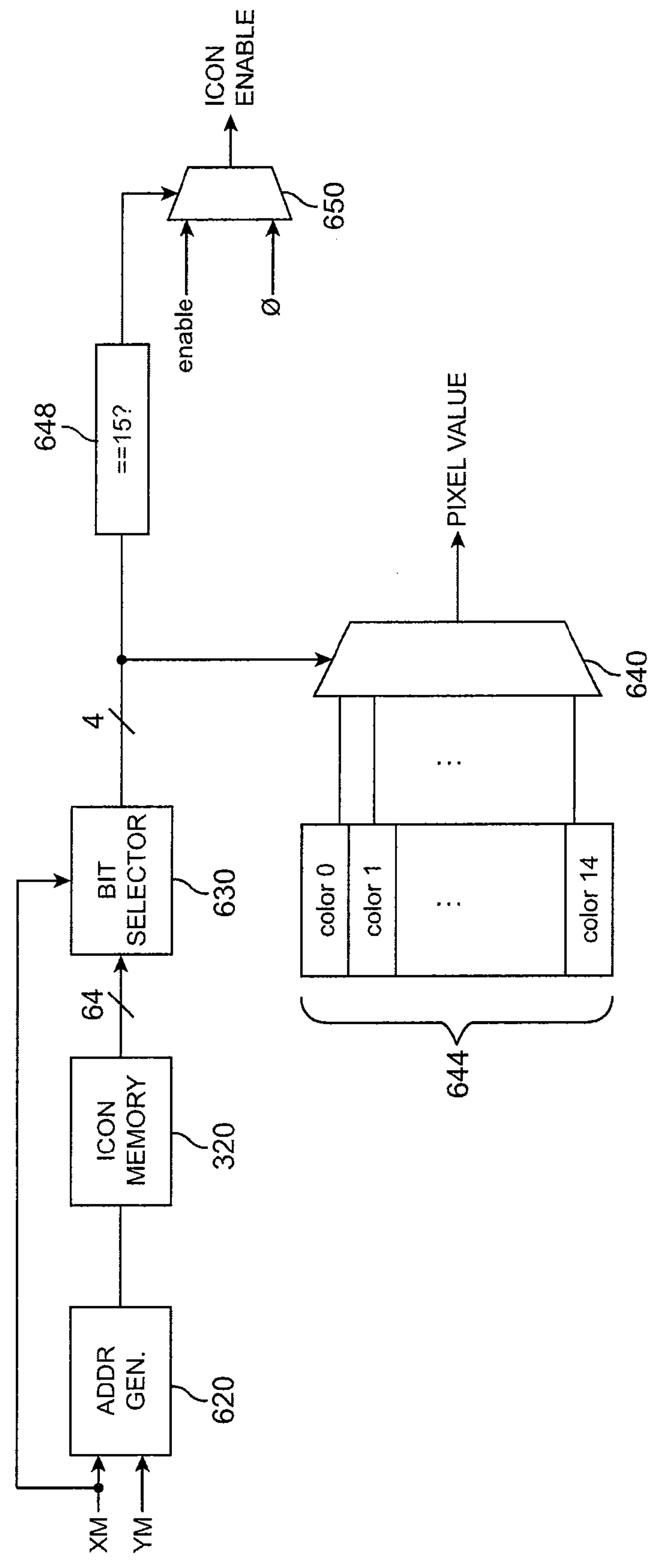
FIG. 6 is a simplified block diagram of color selection logic for a hardware icon according to an embodiment of the present invention.

In some embodiments, the data retrieved from icon memory 320 is a color value. In other embodiments, the data retrieved from icon memory 320 is used to select a color value from a predefined color palette. One embodiment of an icon memory interface using a color palette is illustrated in FIG. 6. In this embodiment, icon memory 320 stores four bits per pixel, and the four-bit value is used to select one of fifteen colors. The sixteenth four-bit value is used to provide alpha-transparency. Address generator 620 identifies the appropriate portion of memory to be read based on input signals XM, YM. For example, icon memory 320 may be a 64×64 RAM storing four bits per pixel, thereby supporting an unmagnified icon size of 32×32 pixels. In this case, each line of pixel data occupies two rows of the RAM, so that address generator 620 selects row 2*YM for pixels in the first half of each line and 2*YM+1 for pixels in the second half of each line. Icon memory 320 is configured to return data for a full row (64 bits) in response to the read operation.

Bit selector 630 selects four bits from the 64 bits based on the input signal XM (i.e., which pixel in the row is to be read). These four bits, representing a value from zero to fifteen, are used to select a color from a predefined color palette. More specifically, in this embodiment, fifteen registers 644 are used to provide a color palette. Each register stores a different color value. The four-bit signal provided by bit selector 630 is used as a control signal for a multiplexer 640, which selects the value from the corresponding one of registers 644. Multiple pixels may be processed in parallel by providing additional multiplexers 644 that use the same registers 644 but receive different portions of the data read from icon memory 320.

In this embodiment, fifteen colors are provided by registers 644. The sixteenth possible value of the four bit selection signal is used to provide alpha transparency for the icon. To provide alpha transparency, when the four bit signal has a value of fifteen, as determined by a comparison module 648, icon enable signal 304 is de-asserted by multiplexer 650. Priority logic unit 138 then ignores the icon pixel value 302 for the pixel so that the corresponding portion of the underlying image is displayed. In an alternative embodiment, alpha transparency is not supported and a sixteenth register 644 may be provided to store a sixteenth color value.

Data controlling the appearance and location of the hardware icon may be provided to icon memory 320 and icon data registers 331-336 in a number of ways. In one embodiment, storage of data in these elements is directed at the BIOS level, independent of any operating system (OS) that may be running on CPU 104. BIOS-level control may advantageously be used, for instance, where a hardware icon is implemented to advise a user of a system hardware condition (e.g., a low battery) that can be detected at the BIOS level. As will be described below, controlling the icon data registers 331-336 at the BIOS level is also useful for providing device security features that are independent of the operating system. In another embodiment, the content of icon memory 320 and icon data registers 331-336 is under the control of the operating system. Any suitable techniques may be used to implement either BIOS-based or OS-based updating of memories and registers; a number of such techniques are known in the art.

It will be appreciated that the icon data source described herein is illustrative, and that other embodiments are possible. The magnification factor F is not limited to any particular values, and any number of magnification modes may be provided. The icon memory structure and addressing may also be varied, and pixels may be processed serially or in parallel. Further, instead of using bits read from the icon memory to map to a color palette as described above, color values may be stored directly in the icon memory. Any number of color values, with or without alpha transparency, may be supported, and one or more color modes may be provided. It is to be noted that the limits on icon size and/or color depth (number of colors) are determined by the size of the icon memory, which is a matter of design choice. The icon memory can also be moved off-chip.

As described above, hardware icon data source 136 provides an icon pixel value 302 and an icon enable signal 304 for each pixel to priority values in generating a composite image. Exemplary embodiments of priority logic unit 138 will now be described.

Figure 7:
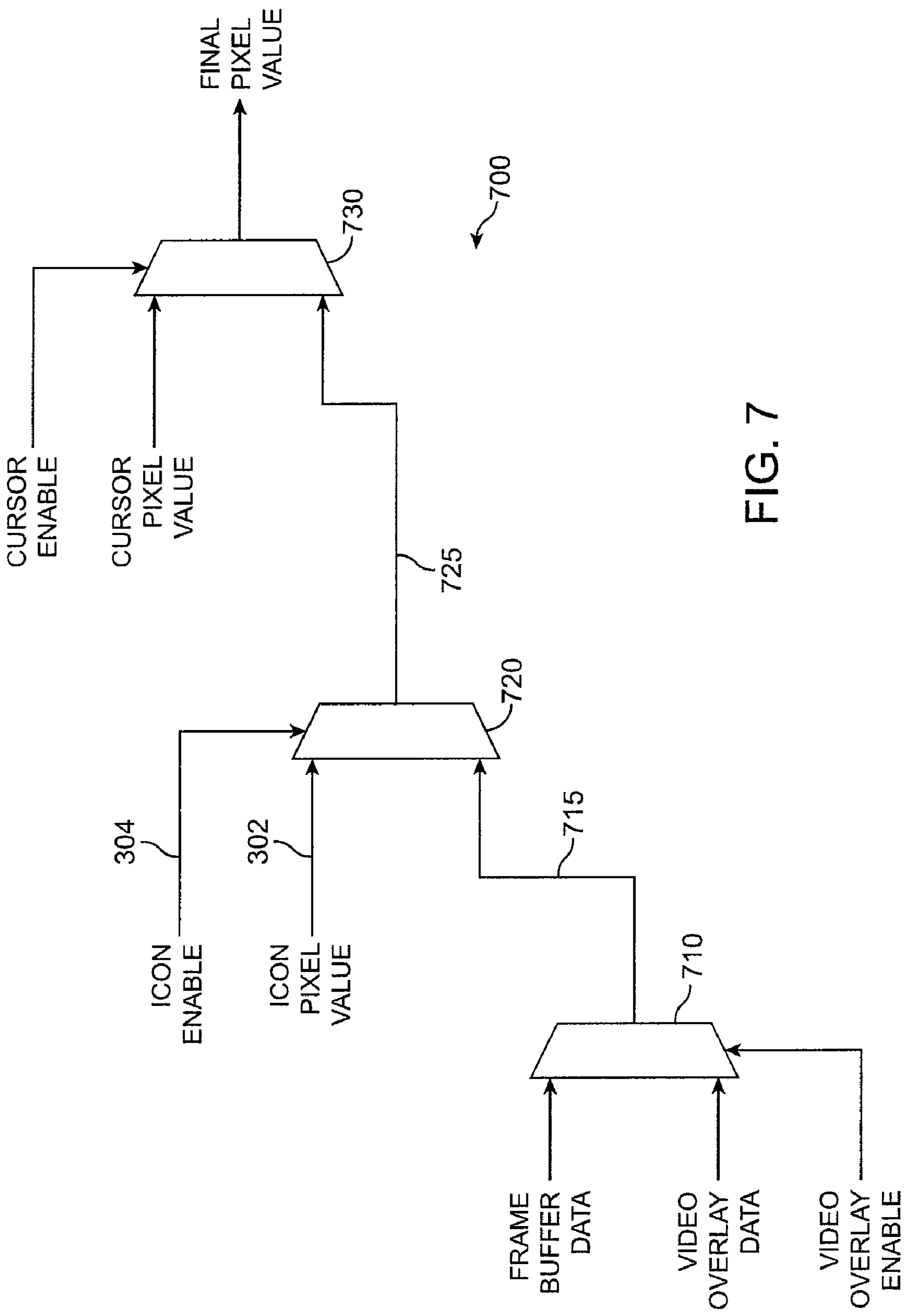
FIG. 7 is a simplified block diagram of a priority logic unit according to an embodiment of the present invention.

FIG. 7 illustrates a priority logic unit 700 in accordance with an embodiment of the present invention. As described above, priority logic unit 138 (of which priority logic unit 700 is one example) determines a final pixel value to be displayed on a display device by selecting among candidate pixel values provided by frame buffer 122, video overlay 124, cursor data source 134, and hardware icon data source 136. In the case of priority logic unit 700, a priority order is imposed so that the cursor appears on top of any other image, and the hardware icon appears on top of any image except the cursor.

More specifically, a frame buffer pixel value (from frame buffer 122) and a video overlay pixel value (from video overlay memory 124) are received at the inputs of a first multiplexer 710. A video overlay enable signal that indicates whether the video overlay is active for the current pixel is used as the control signal for multiplexer 710. If the video overlay is active, first multiplexer 710 provides the video overlay pixel value on a "desktop" data line 715; otherwise, first multiplexer 710 provides the frame buffer pixel value. It is to be understood that a "multiplexer" as used herein includes any device that selects one of a group of inputs as its output in response to a control signal and that any suitable configuration of circuit components may be used to implement this functionality.

A second multiplexer 720 receives as inputs the desktop pixel value from desktop data line 715 and the icon pixel value 302 from hardware icon data source 136. Icon enable signal 304 is provided as a control signal. When icon enable signal 304 is asserted, second multiplexer 720 selects the icon pixel value as an output signal on line 725; otherwise, the desktop pixel value is selected. As described above, the icon enable signal 304 is asserted only for pixels within the icon region. Thus, the icon is displayed on the desired portion of the screen, and the underlying desktop image is displayed elsewhere. In addition, in embodiments where the icon may include transparent pixels, desktop image portions underlying any transparent pixels within the icon are also displayed.

A third multiplexer 730 receives as its inputs the underlying (desktop or icon) pixel value on line 725 and a cursor pixel value provided by cursor data source 134 (FIG. 1). A cursor enable signal is provided by cursor data source 134 as a control signal. When the cursor enable signal is asserted, third multiplexer 730 selects the cursor pixel value as its output; otherwise, third multiplexer 730 selects the underlying (desktop or icon) pixel value from signal line 725. In this way, the cursor is displayed over both the desktop data and the icon data.

It will be appreciated that priority logic unit 700 is illustrative and that variations and modifications are possible. In one variation, the order of signal selection may be changed to obtain a different priority logic. For instance, if it is desired to display the icon over the cursor, then the cursor pixel value and cursor enable signal could be provided to second multiplexer 720, and the icon pixel value and icon enable signal could be provided to third multiplexer 730. In addition, the "desktop" data value may be generated in any suitable manner from any source of application graphics data and/or video overlay data, including one or more frame buffers and/or overlay memories located off the compositor chip. In one alternative embodiment, a frame buffer but not a video overlay is provided; in this case, the desktop data value may be obtained from the frame buffer without the use of first multiplexer 710. Regardless of the manner in which desktop data value is generated, the icon pixel value is selected in preference to the desktop data value whenever the icon enable signal 304 is asserted.

Figure 8:
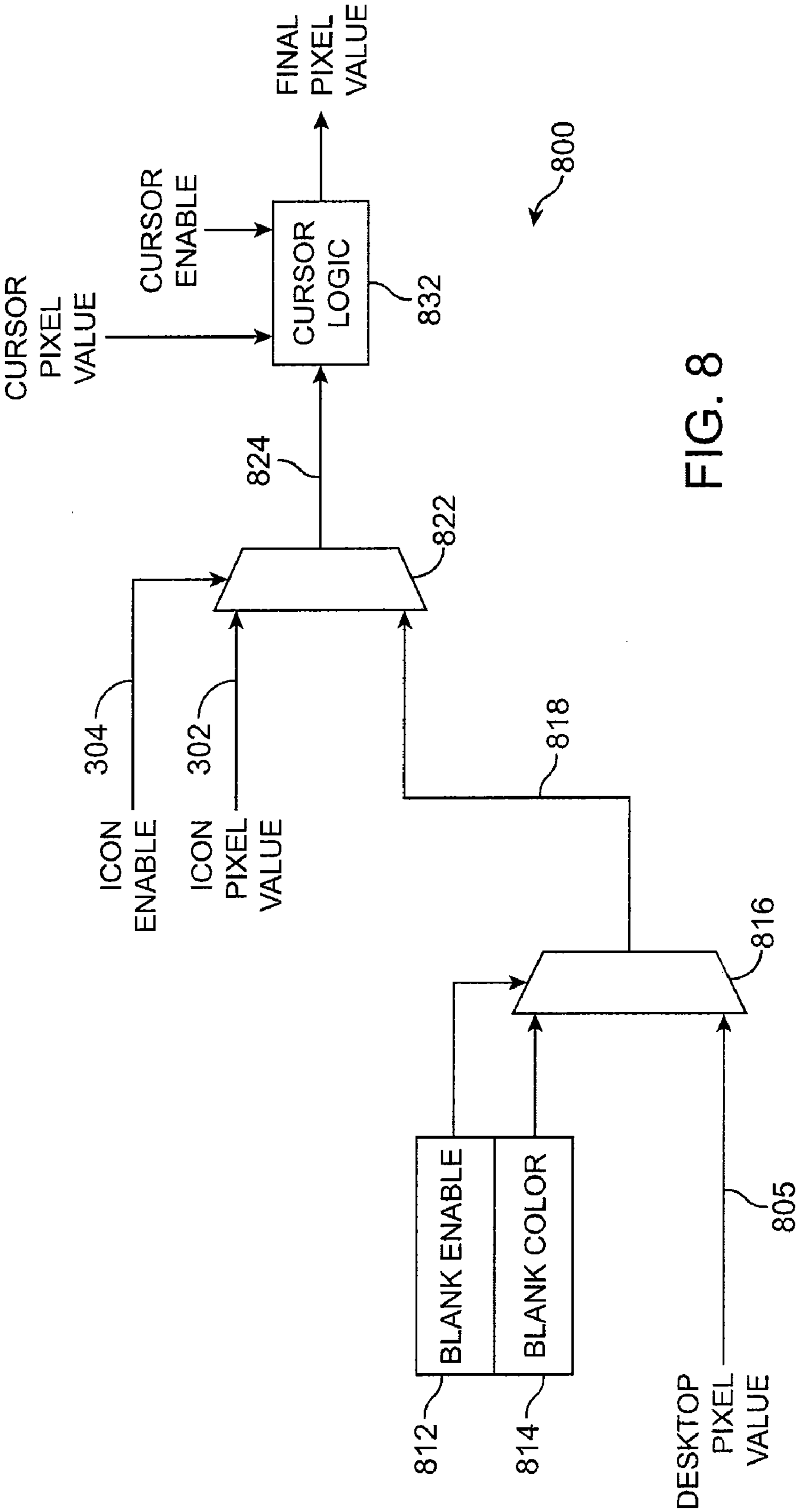
FIG. 8 is a simplified block diagram of a priority logic unit according to a second embodiment of the present invention.

FIG. 8 illustrates a second priority logic unit 800 according to another embodiment of the present invention. In addition to displaying a hardware icon, priority logic unit 800 provides the ability to override the display of desktop data (e.g., frame buffer or video overlays) without affecting the processes that generate that data. That is, the composite image may be a solid color (a blank screen) except for an icon and/or cursor; desktop data is "hidden" from view, although the data is still present in the various desktop data sources.

More specifically, desktop pixel values are provided to priority logic unit 800 on desktop data line 805. Desktop data may include data from a frame buffer, a video-overlay memory, and/or other data sources located off the compositor chip. Where multiple such sources are present, additional logic circuitry (not shown) is provided to select a desktop pixel value. One example of suitable logic circuitry is described above with reference to FIG. 7; other implementations will be apparent to one of ordinary skill in the art in view of the present disclosure.

Priority logic unit 800 includes two on-chip blanking registers 812, 814. First blanking register 812 stores a blank enable signal (e.g., one bit) that controls whether desktop data is to be hidden. Second blanking register 814 stores a color value for a blank-screen color. Like icon registers 331-336 described above, blanking registers 812, 814 may be controlled either by the operating system or at the BIOS level.

A first multiplexer 816 has input terminals coupled to the blank color value from register 814 and the desktop data line 805, and a control terminal coupled to the blank enable signal from register 812. When the blank enable signal is asserted, first multiplexer 816 selects the blank color value from register 814 to be transmitted on its output data line 818 in preference to the desktop pixel value from data line 805; otherwise, the desktop pixel value is selected.

A second multiplexer 822 receives the icon pixel value 302 and the underlying (desktop or blank) pixel value from line 818 at its input terminals. The icon pixel value is transmitted on an output data line 824 when the icon enable signal 304 is asserted; otherwise the underlying (desktop or blank) pixel value from line 818 is transmitted on output data line 824. Cursor logic block 832 combines the cursor color signal with the underlying (desktop, blank, or icon) pixel value from data line 824 to produce the final pixel value.

Figure 9:
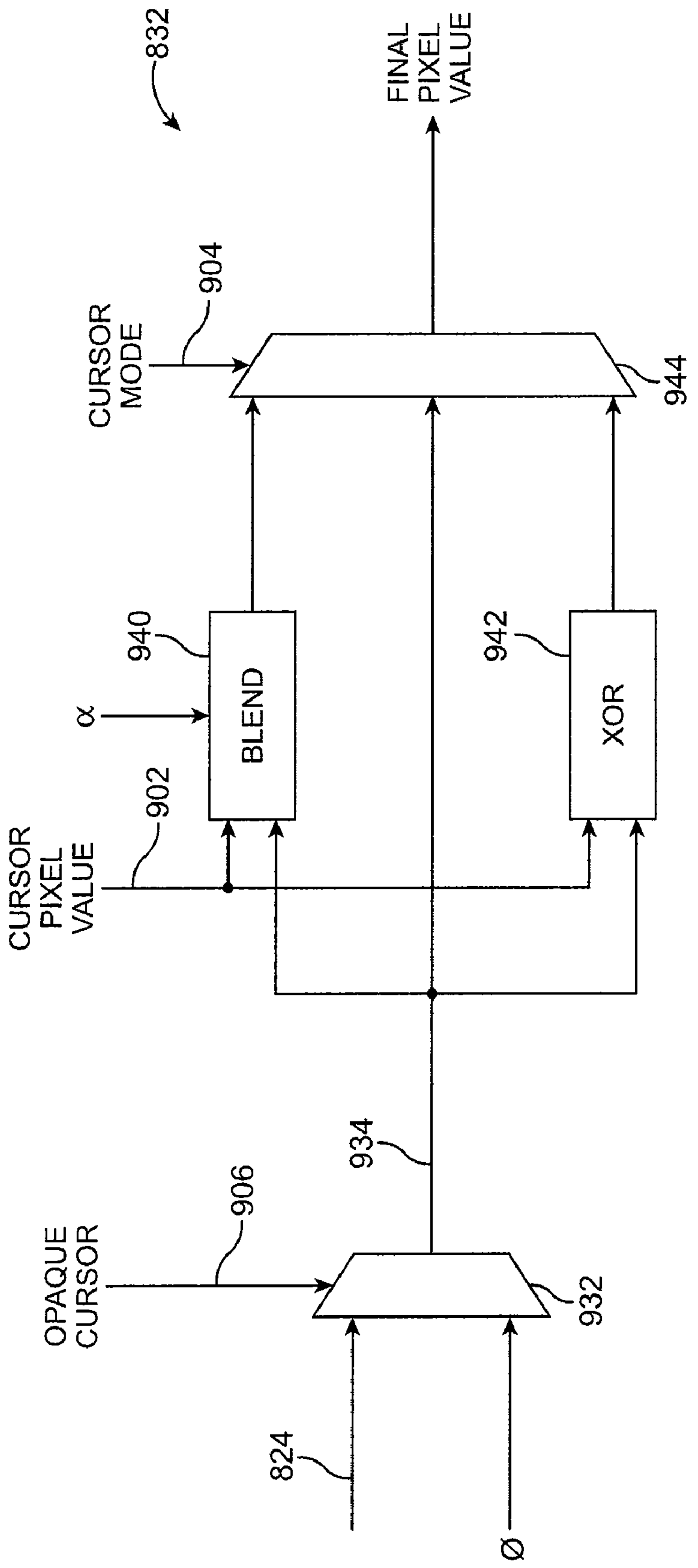
FIG. 9 is a simplified block diagram of a priority logic unit according to a third embodiment of the present invention.

Cursor logic block 832 may be implemented using a multiplexer (as described above with reference to FIG. 7) or using other techniques. One alternative embodiment of cursor logic block 832 is shown in FIG. 9. In this embodiment, the cursor may be selectably displayed either over or under the hardware icon, thereby providing priority logic with increased configurability. In this embodiment, cursor data source 134 provides the following signals: a cursor pixel value 902, a cursor mode signal 904, and an opaque cursor signal 906. Cursor data source 134 can be implemented in various ways, a number of which are known in the art.

A first multiplexer 932 receives as its inputs the underlying desktop, blank, or icon pixel value from data line 824 and a null value. Opaque cursor signal 906 is provided as the control signal. When opaque cursor signal 906 is asserted, the null value is selected in preference to the underlying pixel value from data line 824; otherwise the underlying pixel value from data line 824 is selected. The selected pixel value is provided as an output on data line 934.

The output pixel value on data line 934 is then combined with the cursor pixel value 902 in two ways. First, a "blend" module 940 computes a weighted average of the cursor pixel value and the pixel value from data line 934, where the weighting factor $\alpha(0 \leqq \alpha \leqq 1)$ applied to the cursor pixel value is provided by cursor data source 134 and the pixel value from data line 934 is weighted by a factor of $1-\alpha$. In parallel, an "xor" module 942 performs a logical XOR operation on the cursor pixel value and the pixel value from data line 934. A second multiplexer 944 receives as inputs the blended value from blend module 940, the xor value from xor module 942, and the pixel value from data line 934. The cursor mode signal 904 is a three-state control signal for selecting one of the three inputs as the final pixel value; the three states correspond to "blend," "xor" and "disable" modes.

Using these modes, the appearance of the cursor can be controlled to produce different composite images. For example, to cause the cursor to appear over the hardware icon, the cursor mode may be set to "blend" for all pixels, with the opaque cursor signal 906 being asserted for pixels in which the cursor is present; blend module 940 uses weighting factor $\alpha=1$ for such pixels. Alternatively, opaque cursor signal 906 can be de-asserted, and the weighting factor a can be used to produce effects such as cursor shadows.

To cause the cursor to appear under the hardware icon but over other components of the composite image, the cursor mode signal may be set to "disable" for pixels where the icon enable signal 304 is asserted and to "blend" for all other pixels, with opaque cursor signal 906 being asserted for pixels not covered by the icon in which the cursor is present. To hide the cursor completely, the cursor mode may be set to "disable" for all pixels. The "xor" mode can be used to generate a cursor image that is a photographic negative of the underlying image, as is known in the art.

It will be appreciated that cursor logic unit 832 can be used in any of the embodiments of priority logic unit 138 described above, or in other embodiments of a compositor according to the present invention. In addition, those of ordinary skill in the art with access to the present disclosure will recognize that a module similar to cursor logic unit 832 can be implemented in place of multiplexer 822 for controlling the appearance of the hardware icon, thereby providing additional flexibility in the appearance of the icon. In one embodiment, hardware icon data source 136 is modified to generate a three-state enable signal (with states corresponding to "blend," "xor," and "disable" display modes), as well as a weighting factor $\alpha$, which may be set to 1 to support an opaque hardware icon. Particular techniques for such modifications are known in the art for generating cursor images and can be readily adapted for use with a hardware icon.

As described above, priority logic unit 800 provides the option of displaying a composite image that is a solid color (corresponding to the color value stored in register 814), with the hardware icon and, optionally, the cursor displayed on top. It should be noted that this solid-color composite image may be generated by priority logic unit 800 without affecting the operation of any sources of desktop pixel values on data line 805. For instance, in the system shown in FIG. 1, CPU 104 may be executing an application that causes updating of frame buffer 122. When the "asserted" state of the blank enable signal is stored in register 812, a solid-color composite image is generated by the operation of priority logic unit 800, using the color value stored in register 814. The application executing on CPU 104 may continue to cause updating of frame buffer 122, but all pixel values from frame buffer 122 are simply ignored by priority logic unit 800. Thus, screen blanking can occur without affecting operations of other system components.

As described above, registers 812 and 814 may be controlled directly at the system BIOS level. Thus, screen blanking can be invoked independently of the operating system. While the screen is blanked, the operating system may continue to execute applications and cause updating of the data in a frame buffer, an overlay memory, or any other source of desktop data that may be provided on desktop data line 805.

Figure 10:
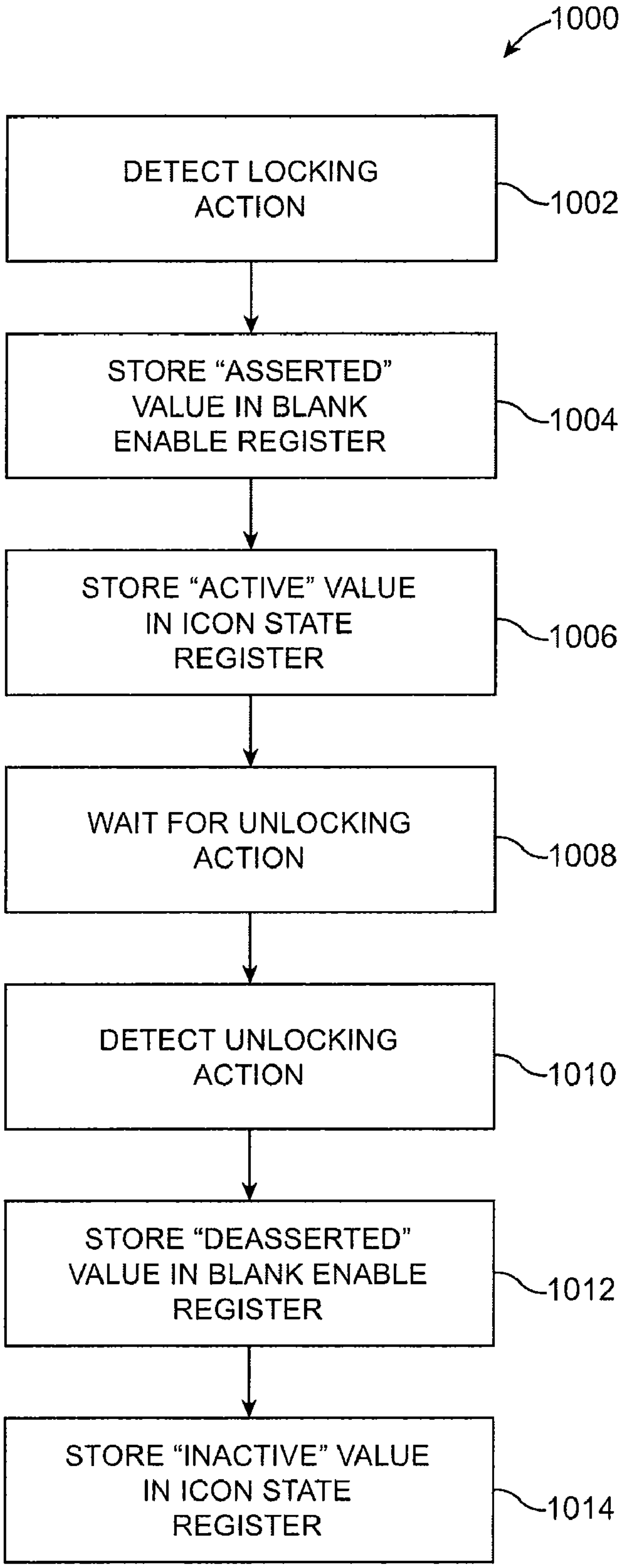
FIG. 10 is a flow chart illustrating a process for securing a device according to an embodiment of the present invention.

In one embodiment, the screen blanking capability may be used for purposes of securing a display device and/or a larger system (e.g., computer system 102) of which the display device is a part. A process 1000 for securing a system is shown in FIG. 10. In one embodiment, this process is implemented at the system BIOS level. At step 1002, the system BIOS detects a locking action performed by the user. The locking action may involve, for instance, activating a dedicated "lock" button or switch, pressing a particular key (or combination or sequence of keys), or operating another designated user interface control. A number of suitable locking actions are known in the art. At step 1004, the system BIOS updates blank enable register 812 by storing the asserted state of the blank enable signal. The color value in register 814 may also be updated at this time, or a previously stored value may be used. Priority logic unit 800 then causes a blank screen to be displayed using the color value from register 814, as described above.

In one embodiment, an icon indicating that the device is in a locked state is displayed. Accordingly, at step 1006, the system BIOS updates icon register 336 by storing an "active" value for the icon state, thereby causing the icon to be displayed. The system BIOS may also update the icon position and magnification data in icon data registers 331-335 and/or the icon image data in icon memory 320.

At step 1008, the system BIOS monitors further user input to detect an unlocking action. During this time, the system, BIOS may cause any user input other than the unlocking action to be ignored. At step 1010, the unlocking action is detected. This action may involve, e.g., entering a password, changing a switch position, and the like. Upon detecting the unlocking action, the system BIOS stores the de-asserted state of the blank enable signal in register 812 (step 1012). If the icon state was set to its "active" value at step 1006, the system BIOS also updates register 336 by storing the "inactive" value at step 1014. Priority logic unit 800 then displays the desktop data, as described above.

Using process 1000, the locking and unlocking operations may be controlled at the system BIOS level without the involvement of the operating system. Thus, the operating system can continue to execute applications normally, while application data is prevented from being seen on the display. In an alternative embodiment, process 1000 may be performed by the operating system.

It will be appreciated that the screen-blanking functionality described herein is not limited to system security applications. The conditions under which the blank enable signal is asserted may be varied according to a particular implementation to serve different purposes. For instance, the blank enable signal can be automatically asserted when a predetermined time elapses without user input, thereby providing a screen-saver function independent of the operating system.

While the invention has been described with respect to exemplary embodiments, one skilled in the art will recognize that numerous modifications are possible. The components and processes described herein may be implemented using digital or analog circuitry, and any combination of hardware and/or software components. The hardware icon data may be stored in any on-chip storage structure, including registers, memory arrays, and the like. Hardware icon pixel values may be provided to the priority logic unit serially or for any number of pixels in parallel. A specific embodiment of a hardware icon data source may provide one or more magnification modes with any magnification factors and may support one or more color modes. Any number of colors may be provided, either by storing color values in the icon memory or using a color palette. More than one hardware icon data source could also be provided; for instance, a first hardware icon data source for a low battery indicator and a second hardware icon data source for a security indicator could both be present.

The priority logic may be implemented in a number of ways and may be configured to process pixels serially or in parallel as desired for a particular display interface. In some embodiments, the screen-blanking functionality may be omitted.

Thus, although the invention has been described with respect to exemplary embodiments, it will be appreciated that the invention is intended to cover all modifications and equivalents within the scope of the following claims.

What is claimed is:

1. A compositor implemented on a chip for providing a final pixel value corresponding to a current pixel, comprising:

a desktop pixel logic circuit configured to supply a desktop pixel value corresponding to the current pixel;

a first on-chip memory configured to store cursor data;

a second on-chip memory configured to store hardware icon data;

a cursor logic circuit configured to read the cursor data from the first on-chip memory and to generate a cursor pixel value corresponding to the current pixel when the current pixel is within a cursor region;

a hardware icon logic circuit configured to read the hardware icon data from the second on-chip memory and to generate an icon pixel value corresponding to the current pixel when the current pixel is within an icon region; and a priority logic circuit configured to compute the final pixel value using one or more of the desktop pixel value, the cursor pixel value, or the icon pixel value, wherein the priority logic circuit is further configured such that when the current pixel is within both the icon region and the cursor region, the icon pixel value is used to compute the final pixel value in the event that an icon enable signal is asserted and the cursor pixel value is used to compute the final pixel value in the event that a cursor enable signal is asserted, wherein the priority logic circuit is configured to compute the final pixel value by blending two or more pixel values selected from a group consisting of the desktop pixel value, the cursor pixel value, and the icon pixel value.

2. The compositor of claim 1, wherein:

the hardware icon logic circuit is further configured to generate an icon enable signal, and the priority logic circuit is further configured such that the icon pixel value is not used to compute the final pixel value when the icon enable signal is not asserted.

3. The compositor of claim 2, wherein the compositor is incorporated into a device and whether the icon enable signal is asserted is determined at least in part by a state of a hardware component of the device.

4. The compositor of claim 1, wherein the desktop pixel logic circuit includes:

a plurality of interfaces, each configured to receive a respective one of a plurality of candidate desktop pixel values; and a selection subcircuit configured to select one of the candidate desktop pixel values as the desktop pixel value.

5. The compositor of claim 1, wherein the priority logic circuit is configured to compute the final pixel value at least in part by selecting one of the desktop pixel value, the cursor pixel value, and the icon pixel value.

6. The compositor of claim 1 wherein the priority logic circuit is configured to compute the final pixel value by performing a logical XOR operation on two values selected from a group of candidate pixel values, wherein the group of candidate pixel values consists of the desktop pixel value, the cursor pixel value, and the icon pixel value.

7. A compositor for providing a final pixel value corresponding to a current pixel, comprising:

a desktop pixel logic circuit configured to supply a desktop pixel value corresponding to the current pixel;

a cursor logic circuit configured to generate a cursor pixel value corresponding to the current pixel using cursor data stored in a first memory when the current pixel is within the cursor region;

a hardware icon logic circuit configured to retrieve hardware icon data from a second memory and to generate an icon pixel value corresponding to the current pixel when the current pixel is within an icon region, wherein the hardware icon logic circuit is further configured to select a pixel of the hardware icon data to be retrieved for the current pixel based in part on an icon magnification signal; and a priority logic circuit configured to compute the final pixel value using one or more of the desktop pixel value, the cursor pixel value, or the icon pixel value.

8. The compositor of claim 7, wherein the compositor is implemented on a chip and the second memory is located on the chip.

9. The compositor of claim 7, wherein:

the hardware icon logic circuit is further configured to generate an icon enable signal; and the priority logic circuit is further configured such that the icon pixel value is not selected as the final pixel value when the icon enable signal is not asserted.

10. The compositor of claim 9, wherein the hardware icon logic circuit includes:

a storage register configured to store an icon state indicator, wherein the icon enable signal is not asserted when the icon state indicator has an inactive value.

11. The compositor of claim 10, wherein the storage register is updated without interaction with an operating system.

12. The compositor of claim 9, wherein the hardware icon logic circuit includes:

a plurality of storage registers configured to store icon position data and an icon magnification factor;

a first subcircuit configured to determine from a screen coordinate of the current pixel, the icon magnification factor, and the icon position data whether the current pixel is within the icon region, wherein the icon enable signal is not asserted when the current pixel is not within the icon region;

a second subcircuit configured to determine a local coordinate of the current pixel from the screen coordinate and the icon magnification factor; and a third subcircuit configured to retrieve the icon pixel value from the second memory based on the local coordinate when the current pixel is within the icon region.

13. The compositor of claim 7, wherein the hardware icon logic circuit is further configured to operate in either of a monochrome mode and a multicolor mode.

14. The compositor of claim 13, wherein the hardware icon logic circuit includes:

a first subcircuit configured to retrieve the hardware icon data from the second memory based on a local coordinate of the current pixel, wherein the first subcircuit retrieves one bit of the hardware icon data in the monochrome mode and a plurality of bits of the hardware icon data in the multicolor mode.

15. The compositor of claim 14, wherein the multicolor mode is a palette color mode.

16. The compositor of claim 15, wherein the hardware icon logic circuit further includes:

a plurality of storage registers, each configured to store a color value; and a multiplexer having a plurality of input terminals, each coupled to receive a color value from a respective one of the plurality of storage registers, a control terminal coupled to receive the hardware icon data retrieved by the memory controller in the multicolor mode, and an output terminal coupled to provide the icon pixel value.

17. A compositor for providing a pixel value corresponding to a current pixel, comprising:

a desktop logic circuit configured to supply a desktop pixel value corresponding to the current pixel;

a cursor logic circuit configured to generate a cursor pixel value corresponding to the current pixel from cursor data stored in a first memory when the current pixel is within a cursor region;

a hardware icon logic circuit configured to read hardware icon data from a second memory and to supply an icon pixel value corresponding to the current pixel when the current pixel is within an icon region, wherein the hardware icon logic circuit is configured to operate in one of a monochrome mode and a multicolor mode in response to a color mode signal; and a priority logic circuit configured to compute the final pixel value using one or more of the desktop pixel value, the cursor pixel value, or the icon pixel value.

18. The compositor of claim 17, wherein the compositor is implemented on a chip and the second memory is located on the chip.

19. The compositor of claim 17, wherein the hardware icon logic circuit comprises:

a first subcircuit configured to retrieve the hardware icon data from the second memory based on a local coordinate of the current pixel, wherein the first subcircuit is configured to retrieve one bit of the hardware icon data in the monochrome mode and a plurality of bits of the hardware icon data in the multicolor mode.

20. The compositor of claim 17, wherein the multicolor mode is a palette color mode.

21. The compositor of claim 20, wherein the hardware icon logic circuit further includes:

a plurality of storage registers, each configured to store a color value; and a multiplexer having a plurality of input terminals, each coupled to receive a color value from a respective one of the plurality of storage registers, a control terminal coupled to receive the hardware icon data retrieved by the memory controller in the multicolor mode, and an output terminal coupled to provide the icon pixel value.

22. The compositor of claim 17, wherein the priority logic circuit is configured to compute the final pixel value at least in part by selecting one of the desktop pixel value, the cursor pixel value, and the icon pixel value.

23. The compositor of claim 17, wherein the priority logic circuit is configured to compute the final pixel value at least in part by blending two or more pixel values selected from a group consisting of the desktop pixel value, the cursor pixel value, and the icon pixel value.

24. The compositor of claim 17, wherein the priority logic circuit is configured to compute the final pixel value by performing a logical XOR operation on two values selected from a group of candidate pixel values, wherein the group of candidate pixel values consists of the desktop pixel value, the cursor pixel value, and the icon pixel value.

25. A compositor for providing a final pixel value corresponding to a current pixel, comprising:

a desktop pixel logic circuit configured to supply a desktop pixel value corresponding to the current pixel;

a cursor logic circuit configured to generate a cursor pixel value corresponding to the current pixel from cursor data stored in a cursor memory when the current pixel is within a cursor region;

a hardware icon logic circuit configured to retrieve hardware icon data from a hardware icon memory and to generate an icon pixel value corresponding to the current pixel when the current pixel is within an icon region, the hardware icon logic circuit selecting a pixel of the hardware icon data to be retrieved for the current pixel based in part on an icon magnification signal; and a priority logic circuit configured to compute the final pixel value using one or more of the desktop pixel value, the cursor pixel value, or the icon pixel value, wherein the priority logic circuit is further configured such that when the current pixel is within both the icon region and the cursor region, the priority logic circuit uses the icon pixel value when an icon enable signal is asserted and the cursor pixel value when a cursor enable signal is asserted.

26. The compositor of claim 25, wherein:

the hardware icon logic circuit is further configured to generate an icon enable signal; and the priority logic circuit is further configured such that the icon pixel value is not selected as the final pixel value when the icon enable signal is not asserted.

27. The compositor of claim 26, wherein the hardware icon logic circuit includes:

a storage register configured to store an icon state indicator, wherein the icon enable signal is not asserted when the icon state indicator has an inactive value.

28. The compositor of claim 27, wherein the storage register is updated without interaction with an operating system.

29. The compositor of claim 25, wherein the hardware icon logic circuit includes:

a plurality of storage registers configured to store icon position data and the icon magnification factor;

a first subcircuit configured to determine from a screen coordinate of the current pixel, the icon magnification factor, and the icon position data whether the current pixel is within the icon region, wherein the icon enable signal is not asserted when the current pixel is not within the icon region;

a second subcircuit configured to determine a local coordinate of the current pixel from the screen coordinate and the icon magnification factor; and a third subcircuit configured to retrieve the icon pixel value from the hardware icon memory based on the local coordinate when the current pixel is within the icon region.

30. The compositor of claim 25, wherein the hardware icon logic circuit is further configured to operate in either of a monochrome mode and a multicolor mode.

31. The compositor of claim 30, wherein the hardware icon logic circuit includes:

a first subcircuit configured to retrieve the hardware icon data from the hardware icon memory based on a local coordinate of the current pixel, wherein the first subcircuit retrieves one bit of the hardware icon data in the monochrome mode and a plurality of bits of the hardware icon data in the multicolor mode.

32. The compositor of claim 31, wherein the multicolor mode is a palette color mode.

33. The compositor of claim 32, wherein the hardware icon logic circuit further includes:

a plurality of storage registers, each configured to store a color value; and a multiplexer having a plurality of input terminals, each coupled to receive a color value from a respective one of the plurality of storage registers, a control terminal coupled to receive the hardware icon data retrieved by the memory controller in the multicolor mode, and an output terminal coupled to provide the icon pixel value.

34. A compositor for providing a pixel value corresponding to a current pixel of a display, comprising:

a desktop pixel logic circuit configured to supply a desktop pixel value corresponding to the current pixel;

a first register configured to store a blank-screen color value;

a second register configured to store a state of a blank enable signal;

a first selection circuit configured to select one of the desktop pixel value and the blank-screen color value to be provided in response to the state of the blank enable signal, wherein when the blank-enable signal is asserted, the blank-screen color value is selected over the desktop pixel value as the pixel value for all pixels of the display;

a hardware icon logic circuit configured to read hardware icon data from a hardware icon memory, to supply an icon pixel value corresponding to the current pixel when the current pixel is within an icon region, and to generate an icon enable signal; and a second selection circuit configured to receive the icon pixel value and the icon enable signal from the hardware icon logic circuit, to receive as an underlying pixel value the selected one of the desktop pixel value and the blank-screen color value, and to provide one of the icon pixel value and the underlying pixel value in response to the icon enable signal.

35. The compositor of claim 34 wherein the state of the blank enable signal is changed in response to a user action.

36. The compositor of claim 34, wherein the state of the blank enable signal is changed without an action by an operating system.

37. A method for providing a final pixel value corresponding to a current pixel, comprising:

receiving a desktop pixel value corresponding to the current pixel;

when the current pixel is within a cursor region, obtaining a cursor pixel value corresponding to the current pixel using cursor data stored in a first on-chip memory;

when the current pixel is within an icon region, obtaining an icon pixel value corresponding to the current pixel using hardware icon data stored in a second on-chip memory, the second on-chip memory being located on the same chip as the first on-chip memory, wherein obtaining the icon pixel value includes selecting a pixel of the hardware icon data based in part on an icon magnification factor; and computing the final pixel value using one or more of the desktop pixel value, the cursor pixel value, or the icon pixel value.

38. The method of claim 37, further comprising:

determining whether the current pixel is within the icon region by using a screen coordinate of the current pixel, the icon magnification factor, and an icon position coordinate.

39. The method of claim 37, wherein obtaining an icon pixel value corresponding to the current pixel includes:

determining a local pixel coordinate when the current pixel is within the icon region, wherein the local pixel coordinate depends on the icon magnification factor; and retrieving a hardware icon data value corresponding to the local pixel coordinate from the second on-chip memory.

40. The method of claim 39, further comprising:

using the retrieved hardware icon data value to select one of a plurality of colors from a predefined color palette.

41. The method of claim 37, wherein obtaining an icon pixel value corresponding to the current pixel includes:

determining whether the hardware icon data is stored in a monochrome mode or a multicolor mode;

when the hardware icon data is stored in the monochrome mode, reading one bit of data from the second on-chip memory; and when the hardware icon data is stored in the multicolor mode, reading at least two bits of data from the second on-chip memory.

42. The method of claim 41, further comprising:

when the icon data is in the multicolor mode, using the at least two bits of data to select a color from a predefined color palette.

43. The method of claim 37, wherein computing the final pixel value includes:

when the current pixel is within both the icon region and the cursor region, using the icon pixel value when an icon enable signal is asserted, and using the cursor pixel value when a cursor enable signal is asserted.

44. The method of claim 37, wherein computing the final pixel value includes:

blending two or more pixel values selected from a group consisting of the icon pixel value, the cursor pixel value, and the desktop pixel value.

45. The method of claim 37, wherein computing the final pixel value includes:

performing a logical XOR operation on two values selected from a group of candidate pixel values, wherein the group of candidate pixel values consists of the icon pixel value, the cursor pixel value, and the desktop pixel value.

46. A method for providing a pixel value corresponding to a current pixel of a display, comprising:

receiving a desktop pixel value corresponding to the current pixel;

receiving a blank enable signal;

when the blank enable signal is in an asserted state, selecting a predefined blank-screen color value as the pixel value for all pixels of the display;

when the blank enable signal is not in the asserted state, selecting the desktop pixel value as the pixel value;

asserting an icon enable signal when a current pixel is within an icon region;

while the icon enable signal is asserted, performing the following acts:

determining an icon pixel value corresponding to the current pixel from hardware icon data stored in an icon memory; and selecting the icon pixel value in preference to the selected one of the blank pixel value or the desktop pixel value.

47. The method of claim 46, further comprising:

detecting a locking action on a device that has the display for which pixel values are being provided;

in response to the locking action, setting the blank enable signal to the asserted state;

subsequently detecting an unlocking action on the device; and in response to the unlocking action, setting the blank enable signal to a non-asserted state.

48. The method of claim 47, wherein setting the blank enable signal to the asserted state and setting the blank enable signal to the non-asserted state are performed without an action by an operating system of the device.

49. A device comprising:

a graphical display configured to display pixel data;

a compositor for providing pixel data corresponding to the current pixel to the graphical display, the compositor including:

a desktop pixel logic circuit configured to supply a desktop pixel value corresponding to the current pixel;

a first on-chip memory configured to store cursor data;

a second on-chip memory configured to store hardware icon data;

a cursor logic circuit configured to read the cursor data from the first on-chip memory and to generate a cursor pixel value corresponding to the current pixel when the current pixel is within a cursor region;

a hardware icon logic circuit configured to read the hardware icon data from the second on-chip memory and to generate an icon pixel value corresponding to the current pixel when the current pixel is within an icon region, the hardware icon logic circuit operating in either of a monochrome mode and a multicolor mode; and a priority logic circuit configured to compute the final pixel value using one or more of the desktop pixel value, the cursor pixel value, or the icon pixel value and to provide the final pixel value to the graphical display, wherein the priority logic circuit is further configured such that when the current pixel is within both the icon region and the cursor region, the icon pixel value is used to compute the final pixel value in the event that an icon enable signal is asserted and the cursor pixel value is used to compute the final pixel value in the event that a cursor enable signal is asserted.

50. The device of claim 49, wherein the hardware icon logic circuit is further configured to generate the icon enable signal; and the priority logic circuit is further configured such that the icon pixel value is not used to compute the final pixel value when the icon enable signal is not asserted.

51. The device of claim 50, wherein the hardware icon logic circuit includes:

a storage register configured to store an icon state indicator, wherein the icon enable signal is not asserted when the icon state indicator has an inactive value.

52. The device of claim 51, wherein the storage register is updated without interaction with an operating system.

53. The device of claim 49, wherein the hardware icon logic circuit is further configured to select a pixel of the hardware icon data to be read for the current pixel based in part on an icon magnification factor.

54. The device of claim 53, wherein the hardware icon logic circuit includes:

a plurality of storage registers configured to store icon position data and the icon magnification factor;

a first subcircuit configured to determine from a screen coordinate of the current pixel, the icon magnification factor, and the icon position data whether the current pixel is within the icon region, wherein the icon enable signal is not asserted when the current pixel is not within the icon region;

a second subcircuit configured to determine a local coordinate of the current pixel from the screen coordinate and the icon magnification factor; and a third subcircuit configured to retrieve the icon pixel value from the second on-chip memory based on the local coordinate when the current pixel is within the icon region.

55. The device of claim 49, wherein the hardware icon logic circuit includes:

a first subcircuit configured to retrieve the hardware icon data from the second on-chip memory based on a local coordinate of the current pixel, wherein the first subcircuit retrieves one bit of the hardware icon data in the monochrome mode and a plurality of bits of the hardware icon data in the multicolor mode.

56. The device of claim 55, wherein the multicolor mode is a palette color mode.

57. The device of claim 56, wherein the hardware icon logic circuit further includes:

a plurality of storage registers, each configured to store a color value; and a multiplexer having a plurality of input terminals, each coupled to receive a color value from a respective one of the plurality of storage registers, a control terminal coupled to receive the hardware icon data retrieved by the memory controller in the multicolor mode, and an output terminal coupled to provide the icon pixel value.

58. The device of claim 49, further comprising:

a frame buffer for storing a first candidate desktop pixel value; and a video overlay memory for storing a second candidate desktop pixel value.

59. The device of claim 58, wherein the desktop pixel logic circuit includes:

a first interface configured to receive the first candidate desktop pixel value;

a second interface configured to receive the second candidate desktop pixel value; and a selection subcircuit configured to select one of the first and second candidate desktop pixel values as the desktop pixel value.

60. The device of claim 49, wherein the priority logic circuit is configured to compute the final pixel value at least in part by selecting one of the desktop pixel value, the cursor pixel value, and the icon pixel value.

61. The device of claim 49, wherein the priority logic circuit is configured to compute the final pixel value at least in part by blending two or more pixels selected from a group consisting of the desktop pixel value, the cursor pixel value, and the icon pixel value.

62. The device of claim 49, wherein the priority logic circuit is configured to compute the final pixel value by performing a logical XOR operation on two values selected from a group of candidate pixel values, wherein the group of candidate pixel values consists of the desktop pixel value, the cursor pixel value, and the icon pixel value.

63. A device comprising:

a graphical display configured to display pixel data;

a compositor for providing pixel data corresponding to the current pixel to the graphical display, the compositor including:

a desktop pixel logic circuit configured to supply a desktop pixel value corresponding to the current pixel;

a first register configured to store a blank-screen color value;

a second register configured to store a state of a blank enable signal;

a first selection circuit configured to select one of the desktop pixel value and the blank-screen color value to be provided in response to the state of the blank enable signal, wherein when the blank-enable signal is asserted, the blank-screen color value is selected over the desktop pixel value as the pixel value for all pixels of the graphical displays;

a hardware icon logic circuit configured to read hardware icon data from an on-chip memory, to supply an icon pixel value corresponding to the current pixel when the current pixel is within an icon region, and to generate an icon enable signal; and a second selection circuit configured to receive the icon pixel value and the icon enable signal from the hardware icon circuit, to receive as an underlying pixel value the selected one of the desktop pixel value and the blank-screen color value, and to provide one of the icon pixel value and the underlying pixel value in response to the icon enable signal.

64. The device of claim 63, further comprising:

a user interface component including a control, wherein the state of the blank enable signal is changed in response to a user manipulation of the control.

65. The device of claim 63, wherein the state of the blank enable signal is changed without an action by an operating system.

* * * * *